United States Patent
Cheung et al.

(10) Patent No.: US 11,594,261 B1
(45) Date of Patent: Feb. 28, 2023

(54) MODULAR RACK SIZED DATA STORAGE TAPE LIBRARY WITH HERMETICALLY SEALED TAPE COMPARTMENT

(71) Applicant: Amazon Technologies, Inc., Seattle, WA (US)

(72) Inventors: Rick Chun Kit Cheung, Lynnwood, WA (US); Luke Thomas Gregory, Mercer Island, WA (US); Priti Choudhary, Seattle, WA (US); Brandyn Giroux, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/203,635

(22) Filed: Mar. 16, 2021

(51) Int. Cl.
*G11B 33/14* (2006.01)
*G11B 5/008* (2006.01)
*G11B 15/68* (2006.01)

(52) U.S. Cl.
CPC ...... *G11B 33/1406* (2013.01); *G11B 5/00813* (2013.01); *G11B 15/6835* (2013.01)

(58) Field of Classification Search
None
See application file for complete search history.

(56) References Cited

U.S. PATENT DOCUMENTS

| | | |
|---|---|---|
| 5,449,229 A | 9/1995 | Aschenbrenner et al. |
| 6,366,982 B1 | 4/2002 | Suzuki et al. |
| 6,467,285 B2 | 10/2002 | Felder et al. |
| 6,478,524 B1 | 11/2002 | Malin |
| 6,563,771 B1 | 5/2003 | Debiez |
| 6,676,026 B1 | 1/2004 | McKinley et al. |
| 6,694,767 B2 | 2/2004 | Junca et al. |
| 6,817,199 B2 | 11/2004 | Patel et al. |
| 6,862,179 B2 | 3/2005 | Beitelmal et al. |
| 7,106,538 B2 | 9/2006 | Minemura et al. |

(Continued)

OTHER PUBLICATIONS

"HumiSonic Compact", Retrieved from URL: http://www.care/usa.com/product/humisonic on Dec. 20, 2016, pp. 1-9.

(Continued)

*Primary Examiner* — Craig A. Renner
(74) *Attorney, Agent, or Firm* — Alexander A. Knapp; Kowert, Hood, Munyon, Rankin & Goetzel, P.C.

(57) ABSTRACT

A modular data storage tape library includes a modular frame having a form factor similar to other types of computing racks. The modular data storage tape library includes a hermetically sealed enclosure within the modular frame and a cooling portion within the modular frame. Data storage tapes, data storage drives and robotics for moving the data storage tapes are included within the hermetically sealed enclosure. A heat exchanger transfers heat from the hermetically sealed enclosure to the cooling portion outside of the sealed enclosure through a boundary of the hermetically sealed enclosure without introducing air from the data center into the hermetically sealed enclosure. Because air is neither introduced nor removed from the hermetically sealed enclosure, humidity fluctuations are minimal, if existent, and contaminants are prevented from entering the hermetically sealed enclosure, thus increasing the life spans of the data storage tapes included in the hermetically sealed enclosure.

20 Claims, 15 Drawing Sheets

(56) References Cited

U.S. PATENT DOCUMENTS

| | | |
|---|---|---|
| 7,277,247 B2 | 10/2007 | Hoshino |
| 7,315,448 B1 | 1/2008 | Bash et al. |
| 7,474,497 B2 | 1/2009 | Jesionowski et al. |
| 7,534,167 B2 | 5/2009 | Day |
| 7,635,246 B2 | 12/2009 | Neeper et al. |
| 7,682,234 B1 | 3/2010 | Beitelmal et al. |
| 7,766,733 B2 | 8/2010 | Kasahara et al. |
| 7,961,419 B2 | 6/2011 | Suzuki et al. |
| 8,090,476 B2 | 1/2012 | Dawson et al. |
| 8,151,046 B2 | 4/2012 | Suzuki et al. |
| 8,203,837 B2 | 6/2012 | Zeighami et al. |
| 8,206,976 B2 | 6/2012 | Kobayashi et al. |
| 8,351,200 B2 | 1/2013 | Arimilli et al. |
| 8,763,414 B2 | 7/2014 | Carlson et al. |
| 8,857,208 B2 | 10/2014 | Malin |
| 9,255,936 B2 | 2/2016 | Hunt et al. |
| 9,888,615 B1 | 2/2018 | Frink et al. |
| 10,681,847 B1 * | 6/2020 | Adrian ............... G11B 33/1406 |
| 2002/0098064 A1 | 7/2002 | Ostwald et al. |
| 2012/0014061 A1 | 1/2012 | Slessman |
| 2012/0243173 A1 | 9/2012 | Archibald et al. |
| 2014/0053588 A1 | 2/2014 | Karrat et al. |
| 2014/0316605 A1 | 10/2014 | Conan et al. |
| 2015/0208553 A1 | 7/2015 | Bauchot et al. |
| 2015/0351290 A1 | 12/2015 | Shedd |
| 2016/0192542 A1 | 6/2016 | LeFebvre et al. |

OTHER PUBLICATIONS

"Scalari3: Easy, Efficient, Scalable Tape Library with LTO Technology", Retrieved from URL: http://www.quantum.com/products/tapelibraries/scalari3/index.aspx on Dec. 20, 2016, pp. 1-5.

"Network/server enclosures TS IT with glazed door, with 482.6 mm (19") mounting angles Model No. DK 5508, 120", Retrieved from URL: http://www.rittal.com/us-en/product/show/variantdetal.action?c=/Enclosures/IT%20network%20and%server%20enclosures/TS%20IT&categoryPath=/PG00 . . . on Dec. 20, 2016, pp. 1-6.

"TopTherm Blue e roof-mounted cooling units Total cooling output 0.50-4.00 kW", Retrieved from URL: http://www.rittal.com/us-en/product/list/variations.action?c=/Climate%20control/Cooling%20units/Roof-Mounted%20Cooling%Units&categoryPath=/PG0001/ . . . on Dec. 20, 2016, pp. 1-3.

* cited by examiner

MODULAR RACK SIZED DATA STORAGE TAPE LIBRARY WITH HERMETICALLY SEALED TAPE COMPARTMENT

BACKGROUND

As the technological capacity for organizations to create, track, and retain information continues to grow, a variety of different technologies for managing and storing the rising tide of information have been developed. Secure and reliable long-term data storage is one such technology that satisfies the need to archive collected information that may be used infrequently. For instance, information archives may be stored on physical mediums, such as magnetic tape data storage.

Magnetic tape cartridges may store archived data for long periods of time and may be susceptible to decay or damage over time if not properly stored. For example, humidity, particulate matter (such as dust), heat, fluctuations in temperature or humidity, etc. may over time cause the magnetic tape in the magnet tape cartridges to decay or become damaged.

Moreover, to avoid such decay or damage over long periods of time, magnetic tape cartridges may need to be maintained in an environment with tighter controls, such as in regard to temperature, humidity, particulate matter, etc., than are acceptable or needed for other computing components such as servers, networking equipment, etc.

BRIEF DESCRIPTION OF THE DRAWINGS

FIG. 4 also illustrates a cut-away view of an interior portion of the data storage tape library comprising a water storage canister and humidifier, according to some embodiments.

FIG. 7 also illustrates baffles that may be used to block air flow through open slots of a tape magazine of the data storage tape library, according to some embodiments.

FIG. 8 also illustrates a climate controller and associated sensors that may be included in the data tape storage library, according to some embodiments.

Figure 1:
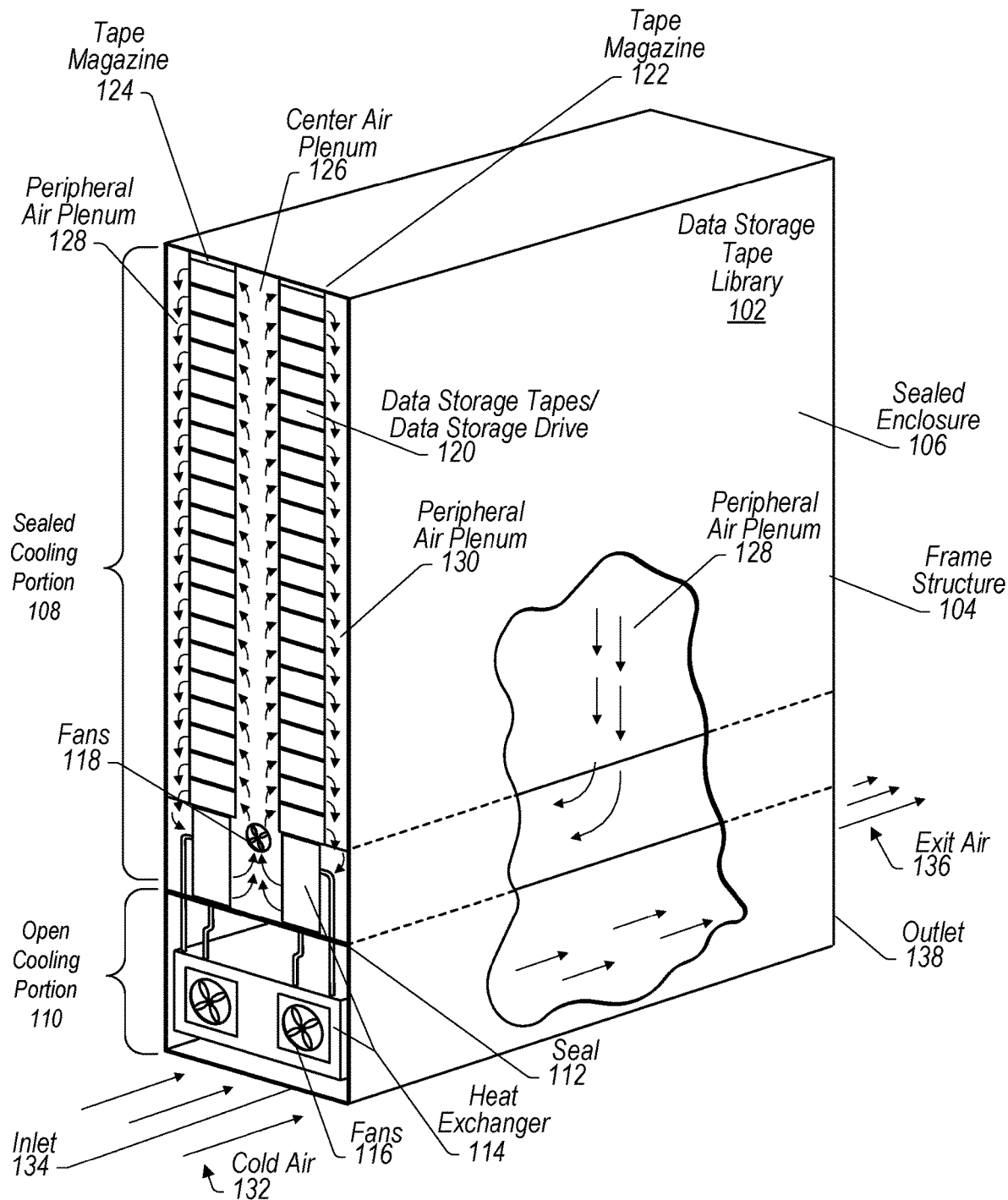
FIG. 1 illustrates a perspective view of interior portions of a data storage tape library comprising a hermetically sealed enclosure and a cooling portion outside of the hermetically sealed enclosure, wherein the data storage tape library has a modular construction configured to be inserted in an open rack space as a unit, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments disclosed herein relate to a modular data storage tape library having a modular frame construction that has a size and form factor similar to a standard computing rack, such as an EIA (Electronics Industries Association) standard 19 inch rack. The modular data storage tape library includes a hermetically sealed enclosure and a cooling portion outside of the hermetically sealed enclosure, wherein both are contained within the form factor of the standard computing rack. Also, the modular data storage tape library is pre-assembled and configured to be shipped to an installation location as a single unit. The hermetically sealed enclosure encloses elements of the data storage tape library including a set of data storage tape cartridges, data storage drives configured to read or write data to, or from, the data storage tape cartridges, and a robotic mechanism configured to shuttle the data storage tape cartridges between storage locations within the hermetically sealed enclosure and the data storage drives included in the hermetically sealed enclosure. Additionally, the modular data storage library includes a heat exchanger comprising a portion within the hermetically sealed enclosure and also comprising a portion of the heat exchanger in the cooling portion of the modular data storage tape library outside of the hermetically sealed enclosure. The heat exchanger is configured to transfer heat from the hermetically sealed enclosure to the cooling portion outside of the sealed enclosure through a boundary of the hermetically sealed enclosure without introducing outside air, outside particulate matter, etc. into the hermetically sealed enclosure.

In contrast to the modular data storage tape library described herein, some conventional archival solutions may involve placing archival hardware (e.g., tape hardware) in special purpose rooms that are separate from portions of a facility, such as a data center, that hosts rack-mounted computing systems. Such special purpose rooms may maintain particular environmental conditions that are stricter than those of the facility, e.g. the data center. Also, such conventional archival solutions may include a large volume of space in the special purpose room that is controlled to the stricter conditions. For example, maintaining temperature and humidity in a large volume may consume considerably more amounts of energy than controlling a smaller volume, such as a volume corresponding to a form factor of a standard rack. Additionally, operating a special purpose room may require a separate cooling system that consumes additional energy at the facility. In contrast, embodiments of the modular data storage tape library described herein allow for the tape environment to be maintained within a smaller volume (the hermetically sealed enclosure) and thus may provide a solution that is more energy efficient and/or cost effective than some conventional archival solutions.

Additionally, whereas conventional archival solutions require considerable lead time and costs to design and construct new special purpose rooms, a modular data storage tape library may have a modular frame construction that includes all necessary components of the data storage tape library in a modular frame as a single unit that can be shipped to a facility, such as a data center, and installed in an open position in a row of racks at the facility. Thus, lead time for a modular data storage tape library is much reduced as compared to conventional archival solutions. Also, the need to design and build special purpose rooms to host a data storage library is eliminated, as the modular data storage tape library includes a self-contained cooling system within the modular frame. For example, the self-contained cooling system includes a heat exchanger configured to transfer heat from the hermetically sealed enclosure to a second portion of the modular data storage tape library that is outside of the sealed enclosure through a boundary of the hermetically sealed enclosure without introducing air from the facility (e.g. data center) into the hermetically sealed enclosure.

In some embodiments, a facility, such as a data center or computer room, may include a modular data storage tape library along with rack computer systems. For instance, the rack computer systems may include servers mounted on server racks as are typically found in data centers. The rack computer systems may be configured to provide computing capacity within a data center environment. In some examples, the data center environment may include a data center temperature range and a data center relative humidity range. For instance, the data center temperature range may be from about 5 degrees Celsius to about 45 degrees Celsius, and the data center relative humidity range may be from about 8 percent to about 85 percent relative humidity. However, the conditions within the hermetically sealed enclosure of the modular data storage tape library installed at the facility may be maintained within tighter ranges, such as 18-25 degrees Celsius and 20 to 50% relative humidity.

In some embodiments, the hermetically sealed enclosure of the modular data storage tape library is climate controlled independent of conditions in a room or space in which the modular data storage tape library is mounted. For example, a temperature, relative humidity, etc. within the hermetically sealed enclosure may be controlled to a different temperature, relative humidity, etc. than the temperature or relative humidity of the room in which the modular data storage tape library is mounted. Also, air (or other type of gas) in the hermetically sealed enclosure may be sealed from outside air in the room in which the modular data storage tape library is mounted, such that outside air does not enter the hermetically sealed enclosure. Instead the air (or other gas) within the hermetically sealed enclosure may be circulated over heat producing components, such as the data storage tape cartridges, data storage drives, robotic mechanism, etc. to remove waste heat from the heat producing components. Additionally, the air (or other gas) within the hermetically sealed enclosure may pass over a portion of a heat exchanger extending into the hermetically sealed enclosure, wherein the heat exchanger removes heat from the circulating air (or other gas) and rejects the removed heat into a cooling medium flowing through a cooling portion of the modular data storage library that is external to the hermetically sealed enclosure, wherein the cooling portion receives air from the surroundings of the modular data storage tape library and exhausts air to which the heat has been transferred to back into the surrounding of the modular data storage tape library. For example, the cooling portion of the modular data storage tape library may receive cooling air from a cold aisle of a computer room/data center and exhaust cooling air that has been used to cool the heat exchanger into a hot aisle of the computer room/data center.

The hermetically sealed enclosure may include tape cartridges configured to store data, data storage drives configured to read or write data to or from the tape cartridges, and a robotic mechanism configured to move the tape cartridges between storage locations within the sealed enclosure and the data storage drives. In some examples, the hermetically sealed enclosure may be maintained within climate conditions ranging from about 18 degrees Celsius to about 25 degrees Celsius, and humidity ranging from about 20 percent to about 50 percent relative humidity.

In some embodiments, the modular data storage tape library may include a central air/cooling fluid plenum in a center portion of the hermetically sealed enclosure. Data storage tape magazines may be positioned on either side of the central air/cooling fluid plenum. Air/cooling fluid may flow from the central plenum across tape cartridges stored in slots of the tape magazines. The air may then flow out of the tape magazines into respective peripheral air plenums situated between the respective tape magazines and respective outer walls of the hermetically sealed enclosure. Portions of the air/cooling fluid may then flow through the respective peripheral air plenums back to the heat exchanger that extends into the hermetically sealed enclosure. This portion of the heat exchanger may remove waste heat from the returned air/cooling fluid such that the returned air/cooling fluid is conditioned to be returned to the central plenum for use in removing heat from the tape cartridges, data storage drives, robotic mechanism, etc. of the data storage tape library. Note that the cool air supply in the center of the hermetically sealed enclosure is not likely to be affected by temperature conditions outside of the modular data storage library. This is because other components around the periphery, such as the peripheral plenums insulate the center plenum from heat conduction and/or heat radiation from sources outside of the modular data storage tape library. Also, the peripheral plenums provide an insulating buffer between tape cartridges included in the tape magazines and the outer walls of the hermetically sealed enclosure. For example, if the modular data storage tape library were to be placed in a row of racks adjacent to a high powered computing rack that generates considerable amounts of waste heat, the waste heat from the adjacent rack, if conducted through, or radiated to, the wall of the hermetically sealed enclosure, would be absorbed by the air/cooling fluid flowing through the peripheral plenum and carried to the heat exchanger for removal, without being conducted to the data tape cartridges in a way that would heat the data tape cartridges outside of an acceptable temperature range.

In some embodiments, a data center includes a row of racks comprising rack-mounted computer systems and at least one data storage tape library positioned in the row of racks. The data storage tape library includes a modular frame structure, a hermetically sealed enclosure within a first portion of the modular frame structure, and a second portion within the modular frame structure that is outside of the hermetically sealed enclosure. The hermetically sealed enclosure within the first portion of the modular frame structure comprises data storage tapes, data storage drives, and a robot mechanism configured to move the data storage tapes between storage locations in the hermetically sealed enclosure and the data storage drives included in the hermetically sealed enclosure. The second portion within the modular frame structure that is outside of the hermetically sealed enclosure includes an inlet configured to receive a cooling fluid or cooling air from a cooling system of the data center and an outlet configured to exhaust the cooling fluid or the cooling air to a return portion of the cooling system of the data center. The data storage tape library also includes a heat exchanger/heat exchanger system comprising components in both the first and second portions, wherein the heat exchanger is configured to transfer heat from the hermetically sealed enclosure to the second portion outside of the sealed enclosure through a boundary of the hermetically sealed enclosure without introducing air from the data center into the hermetically sealed enclosure.

In some embodiments, a data storage tape library includes a modular frame structure, a sealed enclosure positioned within a first portion of the modular frame structure, and a second portion within the modular frame structure that is outside of the sealed enclosure. The sealed enclosure includes data storage tapes included in the sealed enclosure, a data storage drive included in the sealed enclosure, and a robot mechanism included in the sealed enclosure configured to move the data storage tapes between storage locations in the sealed enclosure and the data storage drive included in the sealed enclosure. The second portion within the modular frame structure that is outside of the sealed enclosure includes an inlet configured to receive a cooling medium and an outlet configured to exhaust the cooling medium. The data storage tape library also includes a heat exchanger within the modular frame structure that is configured to transfer heat between the first portion and the second portion through a seal of the sealed enclosure such that heat from the sealed enclosure is rejected into the cooling medium without introducing the cooling medium into the sealed enclosure.

In some embodiments, a method of cooling a data storage tape library includes transferring heat from data storage tapes and a data storage drive included in a sealed enclosure included in a first portion of a modular frame structure for the data storage tape library to a cooling fluid within the sealed enclosure. The method further includes circulating the cooling fluid within the sealed enclosure such that the cooling fluid flows from the data storage tapes and the data storage drive to a heat exchanger comprising a portion at least partially in the sealed enclosure and another portion at least partially external to the sealed enclosure. Additionally, the method includes transferring, via the heat exchanger, heat from the cooling fluid within the sealed enclosure to a cooling medium flowing through a second portion of the modular frame structure of the data storage tape library that is outside of the sealed enclosure. The heat is transferred via the heat exchanger such that heat from the sealed enclosure is rejected into the cooling medium without introducing the cooling medium into the sealed enclosure.

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, testing, simulations, power distribution and control, and operational control.

As used herein, a "plenum" includes any device, apparatus, element, or portion thereof, that can direct, segregate, or channel a fluid, such as air. Examples of plenums include, sheet metal ducts, molded ducts, tubes, or pipes. Also boundaries of a plenum may be formed by other components of a system, such as walls and tape magazines within a hermetically sealed enclosure. The cross sectional shape of a passageway of a plenum may be square, rectangular, round or irregular, and may be uniform or change over the length of the plenum.

As used herein, a "rack" means a rack, container, frame, or other element or combination of elements that can contain or physically support one or more computing devices.

As used herein, "room" means a room or a space of a building. As used herein, "computer room" means a room of a building in which computer systems, such as rack-mounted servers, are operated.

As used herein, a "space" means a space, area or volume.

FIG. 1 illustrates a perspective view of interior portions of a data storage tape library comprising a hermetically sealed enclosure and a cooling portion outside of the hermetically sealed enclosure, wherein the data storage tape library has a modular construction configured to be inserted in an open rack space as a unit, according to some embodiments.

Data storage tape library 102 includes frame structure 104, which may have a similar or same form factor as a standard rack, such as a 19" EIA standard rack. Note that in some embodiments, a standard rack may have a 19" mounting width but a 24" exterior width. Thus, in some embodiments, frame structure 104 may have a 24" outer width that fits within a slot size for a standard 19" rack with an outer width of 24". In some embodiments, frame structure 104 may have other widths. In some embodiments, frame structure 104 may have a depth of 42 inches. Though in some embodiments, other depths such as 36" or 50" may be used. Also, in some embodiments, frame structure 104 may have a height equivalent to a 48 U standard rack. For example, frame structure 104 may have a height of approximately 7 feet. Though in some embodiments, frame structure 104 may be shorter, such as having a height equivalent to 42 U, 22 U, 27 U, etc. or taller having height up to 70 U.

Contained within the frame structure 104 is a hermetically sealed enclosure 106 that forms a sealed cooling portion 108 of the data storage tape library 102. Also contained within the frame structure 104 is an open cooling portion 110 configured to remove heat from the sealed cooling portion 108 and reject the removed heat into a cooling medium passing through the open cooling portion 110. Seal 112 separates hermetically sealed cooling portion 108 from open cooling portion 110. In some embodiments, seal 112 may be formed by welded, stamped, or otherwise bonded pieces of sheet metal, along with gaskets, interface sealants, etc. such that sealed cooling portion 108 is hermetically sealed such that outside air and contaminants are prevented from entering sealed cooling portion 108.

Heat exchanger 114 includes portions both in the sealed cooling portion 108 (e.g. sealed enclosure 106) and open cooling portion 110. Heat exchanger 114 may circulate a cooling fluid between the sealed cooling portion 108 and the open cooling portion 110, such that the cooling fluid absorbs waste heat in sealed cooling portion 108 and transfers the waste heat to a heat rejection portion of the heat exchanger 114 that is located in the open cooling portion 110. Note that while the cooling fluid in the heat exchanger 114 may circulate between the sealed cooling portion 108 and the open cooling portion 110, the cooling fluid is contained within tubes, coils, fins, etc. of the heat exchanger 114 such that while the cooling fluid flows through the interior of the tubes, coils, fins, etc. while in the sealed cooling portion 108, the cooling fluid is prevented from entering an air space of the sealed enclosure 106. Also outside air, particulate matter, moisture, etc. are prevented from entering the sealed enclosure 106/sealed cooling portion 108.

In some embodiments, data storage tape library 102 includes fans 116 that cause cold air 132 to be drawn into inlet 134 of open cooling portion 110 and exhausted out of open cooling portion 110, via outlet 138, as exit air 136. In some embodiments, other cooling fluids may be used such as a liquid cooling fluid and fans 116 may be replaced with pumps or may be omitted. Note that fans 116 may be located at either end of open cooling portion 110, but are shown at the inlet end 134 for ease of illustration in FIG. 1.

Data storage tape library 102 also includes fans 118 located within the interior of sealed enclosure 106. While a single fan is shown in FIG. 1 for ease of illustration, in some embodiments, data storage tape library 102 may include an array of fans extending along a depth of the data storage tape library at a bottom portion of center air plenum 126.

Figure 2:
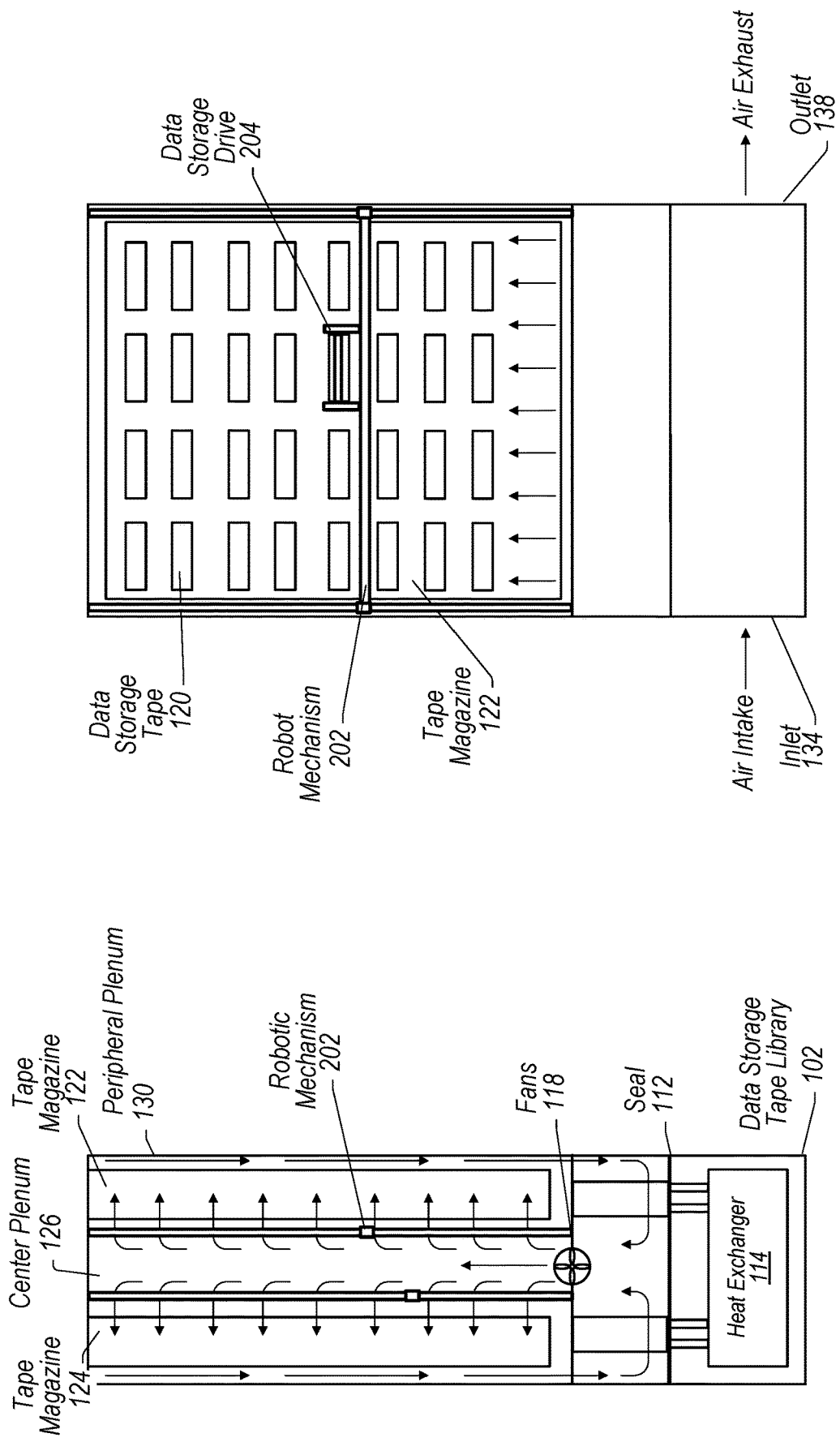
FIG. 2A illustrates a front view of interior portions of a data storage tape library comprising a hermetically sealed enclosure and a cooling portion outside of the hermetically sealed enclosure, wherein the data storage tape library has a modular construction configured to be inserted in an open rack space as a unit, according to some embodiments.
FIG. 2B illustrates a cross-sectional side view of a data storage tape library comprising a hermetically sealed enclosure and a cooling portion outside of the hermetically sealed enclosure, wherein the data storage tape library has a modular construction configured to be inserted in an open rack space as a unit, according to some embodiments.

Enclosed within the hermetically sealed enclosure 106 are data storage tapes and drives 120 mounted in respective tape magazines on either side of center air plenum 122. Also (not shown in FIG. 1, but shown in FIG. 2) is a robotic mechanism 202 configured to move the data storage tapes between storage locations in the sealed enclosure and the data storage drive included in the sealed enclosure.

Additionally, sealed enclosure 106 includes peripheral air plenums 128 and 130 formed by a space between tape magazines 122 and 124 and respective side walls of the sealed enclosure 106.

Fans 118 cause air (or another cooling fluid, such as an inert gas (e.g. nitrogen) to be circulated within the sealed enclosure 106. For example, the air (or other cooling fluid) is drawn across portions of heat exchanger 114 that extend into the sealed enclosure 106, the air or other cooling fluid is further drawn up through the fans 118 into center plenum 126, through tape magazines 122 and 124 on either side of center plenum 126 (and across the data storage tapes and data storage drives 120 included in the tape magazines 122 and 124) and into peripheral plenums 128 and 130. From the peripheral plenums 128 and 130 the air or other cooling fluid that has removed waste heat from the data storage tapes and data storage drives 120 is drawn back toward the portions of heat exchanger 114 located in the sealed enclosure and across those portions of the heat exchanger 114. Thus the removed waste heat from the data storage tapes and data storage drives 120 is exchanged from the air (or other cooling fluid) of the sealed enclosure 106 to a working fluid inside the tubes, coils, fins, etc. of heat exchanger 114. The working fluid within the tubes, coils, fins, etc. of heat exchanger 114 is circulated to another set of tubes, coils, fins, etc. of heat exchanger 114 that are located in open cooling portion 110 and the waste heat is further rejected into the cooling medium (e.g. cold air 132) that is flowing through the open cooling portion 110. Note that in some embodiments open cooling portion 110 may include a plenum extending from the front to the back of data storage tape library 102 and which may include tubes, coils, fins, etc. of heat exchanger 114 positioned within the plenum.

FIG. 1 also shows a cut-away view through a portion of the side wall of the sealed enclosure 106 which shows air flow down through peripheral plenum 128 and then across and through heat exchanger 114.

While not shown in FIG. 1, in some embodiments, sealed enclosure 106 may include an air filter to filter out any residual particulate matter than may have been included in sealed enclosure 106 prior to sealing the sealed enclosure. For example a filter may be included up stream of fans 118, in some embodiments.

FIG. 2A illustrates a front view of interior portions of a data storage tape library comprising a hermetically sealed enclosure and a cooling portion outside of the hermetically sealed enclosure, wherein the data storage tape library has a modular construction configured to be inserted in an open rack space as a unit, according to some embodiments.

As can be seen in FIG. 2A a robot mechanism 202 (or set of robot mechanisms 202) may be included in the center plenum 126, wherein the robot mechanisms are configured to move data storage tapes 120 between storage locations in the tape magazines 122 and 124 and a data storage drive included in the tape magazines 122 and/or 124, wherein the data storage drive is configured to read or write data to the tapes.

FIG. 2B illustrates a cross-sectional side view of a data storage tape library comprising a hermetically sealed enclosure and a cooling portion outside of the hermetically sealed enclosure, wherein the data storage tape library has a modular construction configured to be inserted in an open rack space as a unit, according to some embodiments.

FIG. 2B shows a data storage tape 120 being inserted into data storage drive 204 via robot mechanism 202 which may articulate up and down over a height of tape magazine 122 and may traverse side to side across a width of tape magazine 122.

Figure 3:
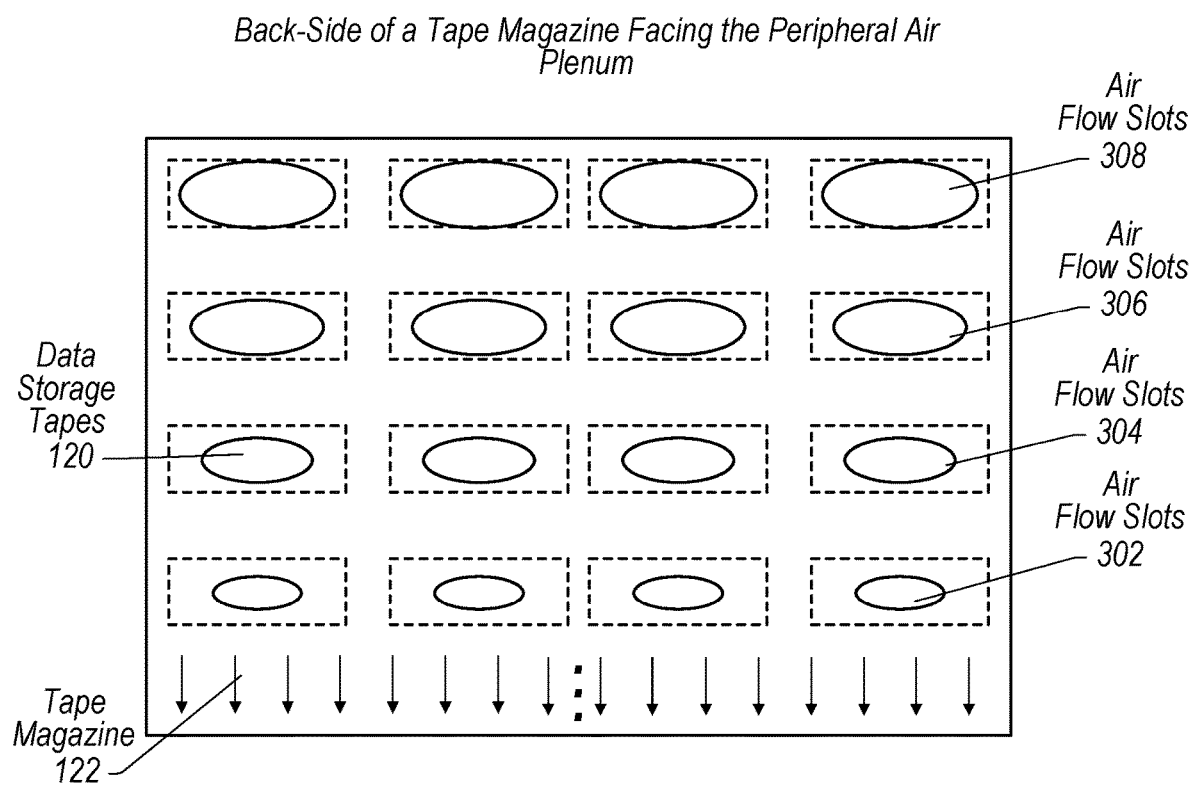
FIG. 3 illustrates a side view of a tape magazine of a data storage tape library comprising a hermetically sealed enclosure and a cooling portion outside of the hermetically sealed enclosure, wherein the tape magazine is viewed from a side facing towards a peripheral plenum of the data storage tape library, according to some embodiments.

FIG. 3 illustrates a side view of a tape magazine of a data storage tape library comprising a hermetically sealed enclosure and a cooling portion outside of the hermetically sealed enclosure, wherein the tape magazine is viewed from a side facing towards a peripheral plenum of the data storage tape library, according to some embodiments.

Whereas an interior side of a tape magazine, such as tape magazine 122 shown in FIG. 2B may include open slots into which a robotic mechanism 202 may reach to retrieve and return data storage tapes 120, an opposing side of the tape magazine 122 (or a frame structure of the tape magazine 122) may include air flow slots that enable air to flow through the tape magazine and across the data storage tapes stored at storage locations corresponding to slots of the tape magazine. In some embodiments, the air flow slots may have varying dimensions, such that air flow slots further away from the fans 118 have larger dimensions than air flow slots closer to the fans 118. This may balance airflow through the tape magazine. For example, pressure drop through the center plenum 126 may require larger diameter (less restriction to flow) air flow slots for tape magazine cartridge slots further from the fan to achieve equivalent air flow rates through the respective slots of the tape magazine.

For example, tape magazine 122 includes air flow slots 308 at a furthest end of the tape magazine opposite an end closest to the fans 118, wherein flow slots 308 have a larger cross-sectional area than flow slots 306, which in turn have a larger cross-sectional area than flow slots 304, which again have a larger cross-section area than flow slots 302, etc. Note that flow slots 308, 306, 304, 302, etc. may have different shapes. Ovals are shown as an example in FIG. 3. However, in some embodiments, air flow slots, such as a single set of air flow slots 302 may include multiple slots aligned with air passages across or over the tape cartridges. Though even if a given set of air flow slots includes more than one slot, the overall cross-section area of the set of slots (e.g. size or number of openings) may increase in a direction away from fans 118 to achieve balanced air flow.

Figure 4:
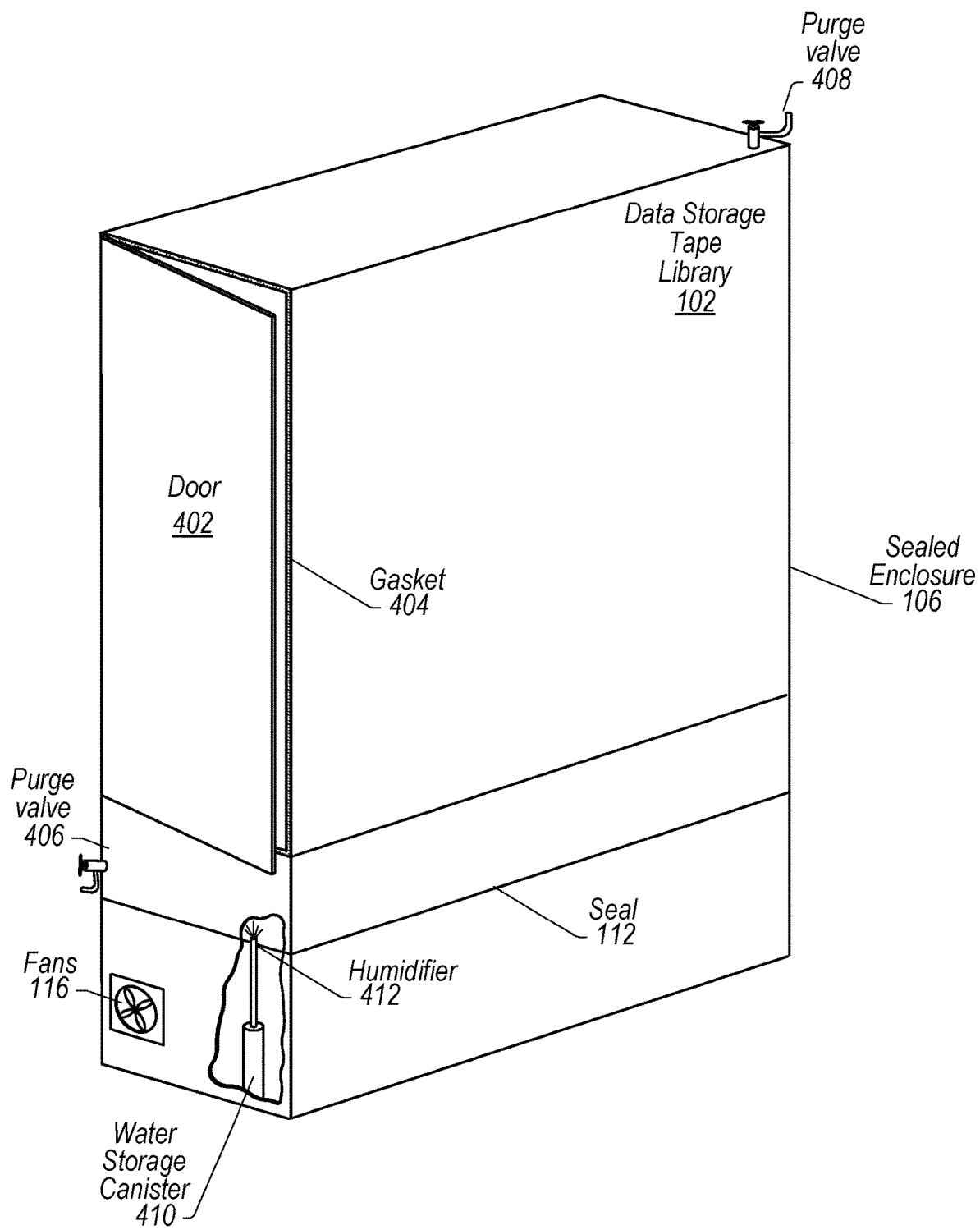
FIG. 4 illustrates a perspective view of an exterior of a data storage tape library comprising a hermetically sealed enclosure and a cooling portion outside of the hermetically sealed enclosure, wherein the data storage tape library has a modular construction configured to be inserted in an open rack space as a unit.

FIG. 4 illustrates a perspective view of an exterior of a data storage tape library comprising a hermetically sealed enclosure and a cooling portion outside of the hermetically sealed enclosure, wherein the data storage tape library has a modular construction configured to be inserted in an open rack space as a unit. FIG. 4 also illustrates a cut-away view of an interior portion of the data storage tape library comprising a water storage canister and humidifier, according to some embodiments.

In some embodiments, a data storage tape library, such as data storage tape library 102, may be purged with an inert gas, such as nitrogen prior to being put in service or after being opened for maintenance (or to add or remove tape cartridges). Purging the data storage library may remove moisture from the hermetically sealed enclosure 106. Also the inert gas may be certified to be free from or contain a near-zero concentration of particulate matter, such that the purge removes particulate matter and does not introduce particulate matter into the hermetically sealed enclosure 106. In some embodiments, data storage tape library 102 includes purge values 406 and 408 for use in performing a purge of the hermetically sealed enclosure 106.

Also, in some embodiments, data storage tape library 102 includes water storage canister 410 in the open portion 110 outside of the hermetically sealed enclosure 106 and a humidifier 412 configured to inject water vapor into the hermetically sealed enclosure 106. For example, in some embodiments, after purging the sealed enclosure 106 with an inert gas (e.g. dry gas) humidifier 412 may be used to add sufficient water vapor back into the inert gas filling the hermetically sealed enclosure 106, such that the relative humidity within the sealed enclosure 106 is within a recommended relative humidity range for storing the data storage tape cartridges. For example, some types of data storage magnetic tape is designed to be stored in environments with at least some humidity and may become dried out or brittle if stored in an environment with no humidity.

Also in some embodiments, data storage tape library 102 includes door 402 and gaskets 404 around a periphery of the door 402. Door 402 may be opened to gain access to an interior of the sealed enclosure 106 and may be closed in a way that engages gaskets 404 to hermetically seal the sealed enclosure. In some embodiments, subsequent to opening and then closing door 402, the sealed enclosure 106 may be purged using an inert gas and a humidity level of the purged sealed enclosure 106 adjusted back to a recommended humidity range for the data storage tapes 120.

Figure 5:
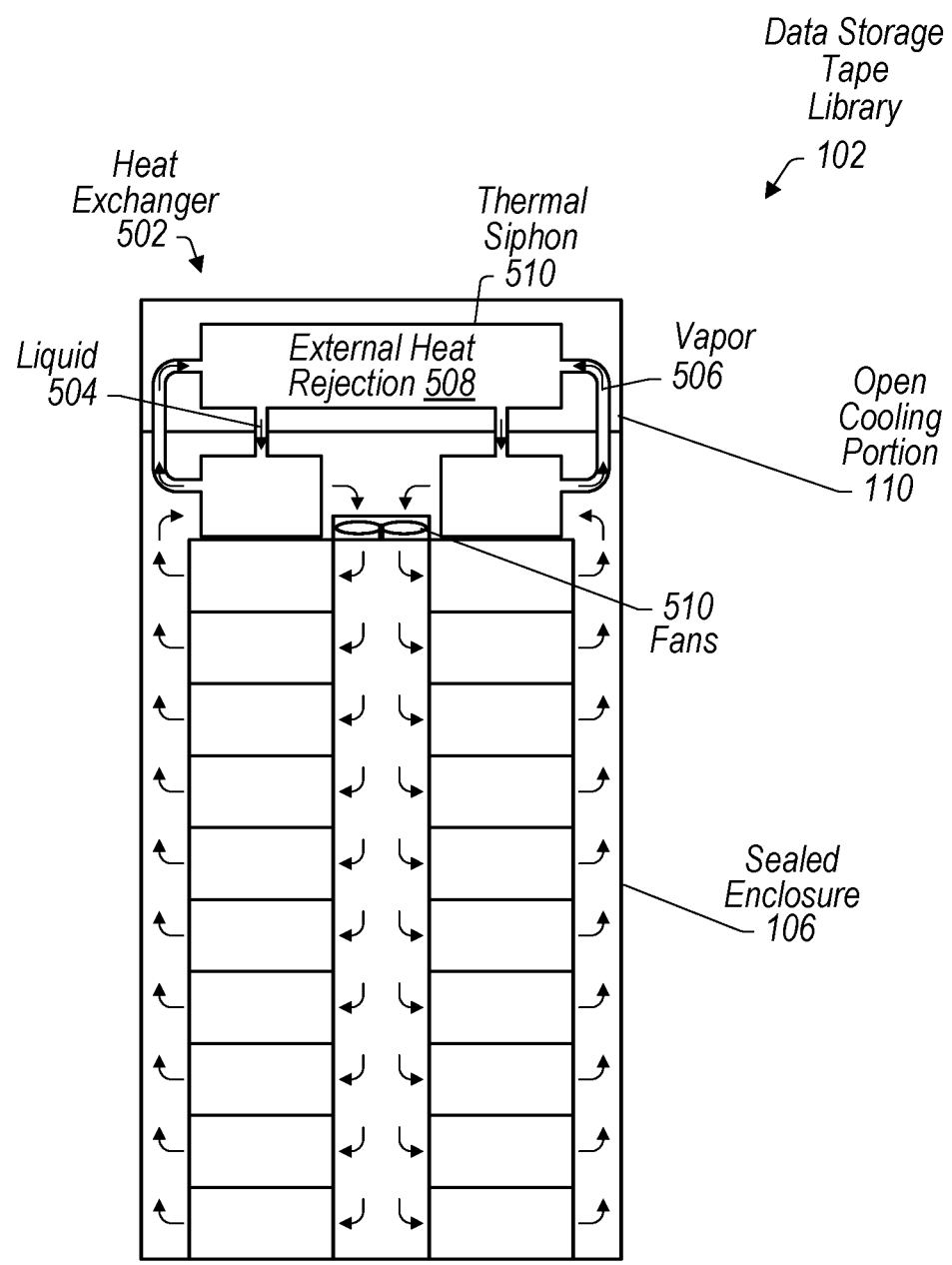
FIG. 5 illustrates a front view of an interior of an example configuration of a data storage tape library comprising a hermetically sealed enclosure and a cooling portion outside of the hermetically sealed enclosure, wherein the data storage tape library has a modular construction configured to be inserted in an open rack space as a unit, and wherein the data storage tape library includes a thermal siphon to transfer heat between the hermetically sealed enclosure and the cooling portion outside of the hermetically sealed enclosure, according to some embodiments.

FIG. 5 illustrates a front view of an interior of an example configuration of a data storage tape library comprising a hermetically sealed enclosure and a cooling portion outside of the hermetically sealed enclosure, wherein the data storage tape library has a modular construction configured to be inserted in an open rack space as a unit, and wherein the data storage tape library includes a thermal siphon to transfer heat between the hermetically sealed enclosure and the cooling portion outside of the hermetically sealed enclosure, according to some embodiments.

Figure 6:
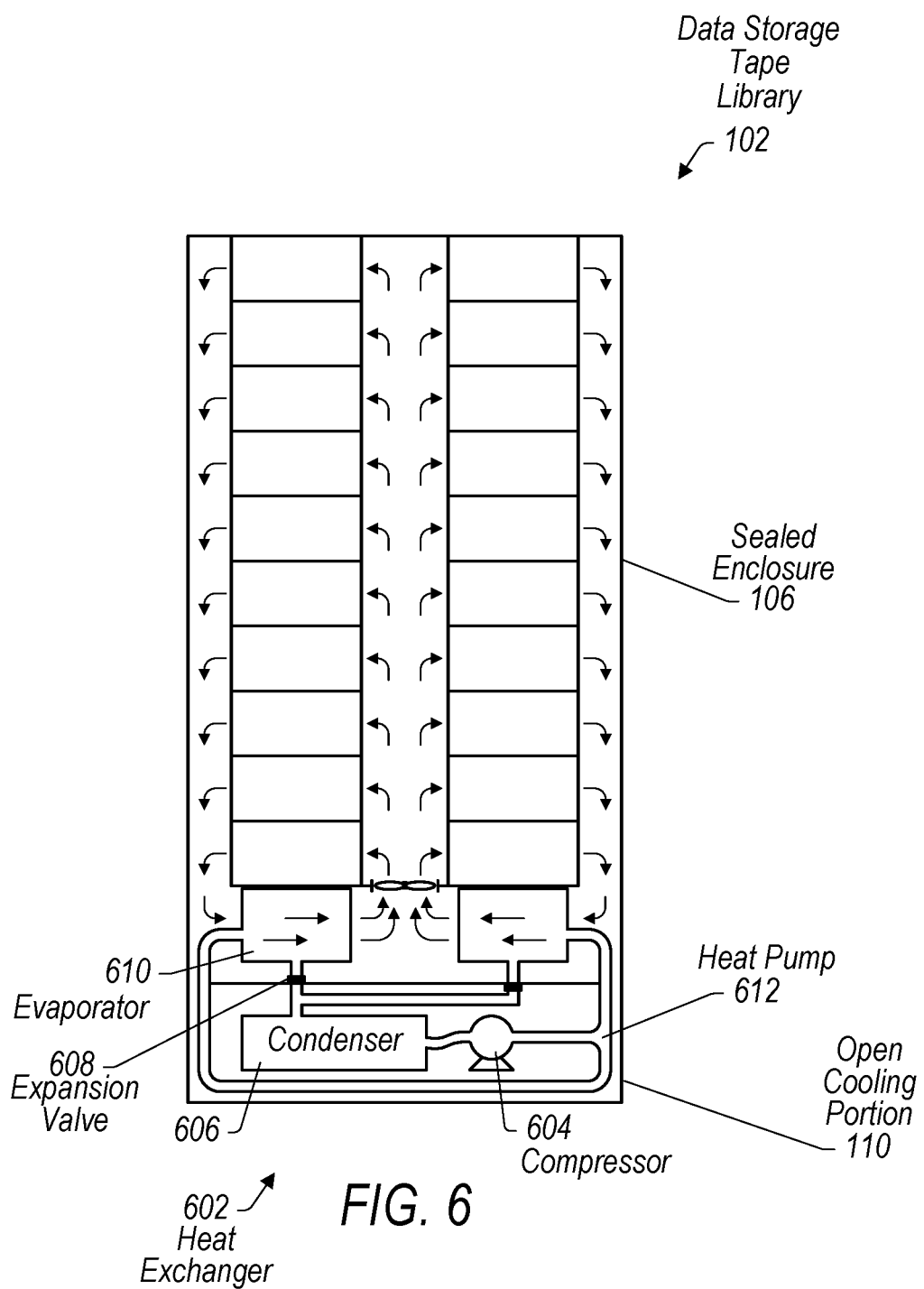
FIG. 6 illustrates a front view of an interior of an example configuration of a data storage tape library comprising a hermetically sealed enclosure and a cooling portion outside of the hermetically sealed enclosure, wherein the data storage tape library has a modular construction configured to be inserted in an open rack space as a unit, and wherein the data storage tape library includes a heat pump to transfer heat between the hermetically sealed enclosure and the cooling portion outside of the hermetically sealed enclosure, according to some embodiments.

In some embodiments, heat exchanger 114 and fans 118 may be located in a top portion of the data storage tape library 102 as shown in FIG. 5 or in a bottom portion of the data storage tape library 102 as shown in FIG. 6.

In some embodiments, the heat exchanger, such as heat exchanger 114 shown in FIG. 1, may be a heat exchanger such as heat exchanger 502 shown in FIG. 5. Heat exchanger 502 includes a thermal siphon 510 comprising a liquid working fluid 504 that changes phases to a gas phase due to heat absorbed from air circulating within the sealed enclosure 106 passing across portions of the thermal siphon 510 upstream of fans 510. The vapor 506 travels up to external heat rejection portion 508 wherein it is condensed back to a vapor by cool air (such as cold air 132) flowing across the external heat rejection portion 508. The condensed liquid 504 gravity feeds back down into the portion of heat exchanger 502 in the sealed enclosure 106 and continues the cycle by absorbing heat from the air (or other cooling fluid) circulated within the sealed enclosure 106 and changing phases back to the vapor phase 506.

FIG. 6 illustrates a front view of an interior of an example configuration of a data storage tape library comprising a hermetically sealed enclosure and a cooling portion outside of the hermetically sealed enclosure, wherein the data storage tape library has a modular construction configured to be inserted in an open rack space as a unit, and wherein the data storage tape library includes a heat pump to transfer heat between the hermetically sealed enclosure and the cooling portion outside of the hermetically sealed enclosure, according to some embodiments.

In some embodiments, the heat exchanger, such as heat exchanger 114 shown in FIG. 1, may be a heat exchanger such as heat exchanger 602 shown in FIG. 6. Heat exchanger 602 includes a heat pump 612 comprising a refrigerant working fluid that is compressed via compressor 604 and condensed via condenser 606. The condensed refrigerant is expanded via expansion valves 608 and evaporated in evaporator 610, wherein evaporator 610 is located within sealed enclosure 106, but compressor 604 and condenser 606 are located in open cooling portion 110 outside of the sealed enclosure 106.

Note that in both FIG. 5 and in FIG. 5 the tubes/pipes of the heat exchanger 502 and 602 passing between the open cooling portion 110 and the sealed enclosure 106 are sealed between an outer wall of the tubes/pipes and a plate of the sealed enclosure 106 through which the tubes/pipes pass.

Figure 7:
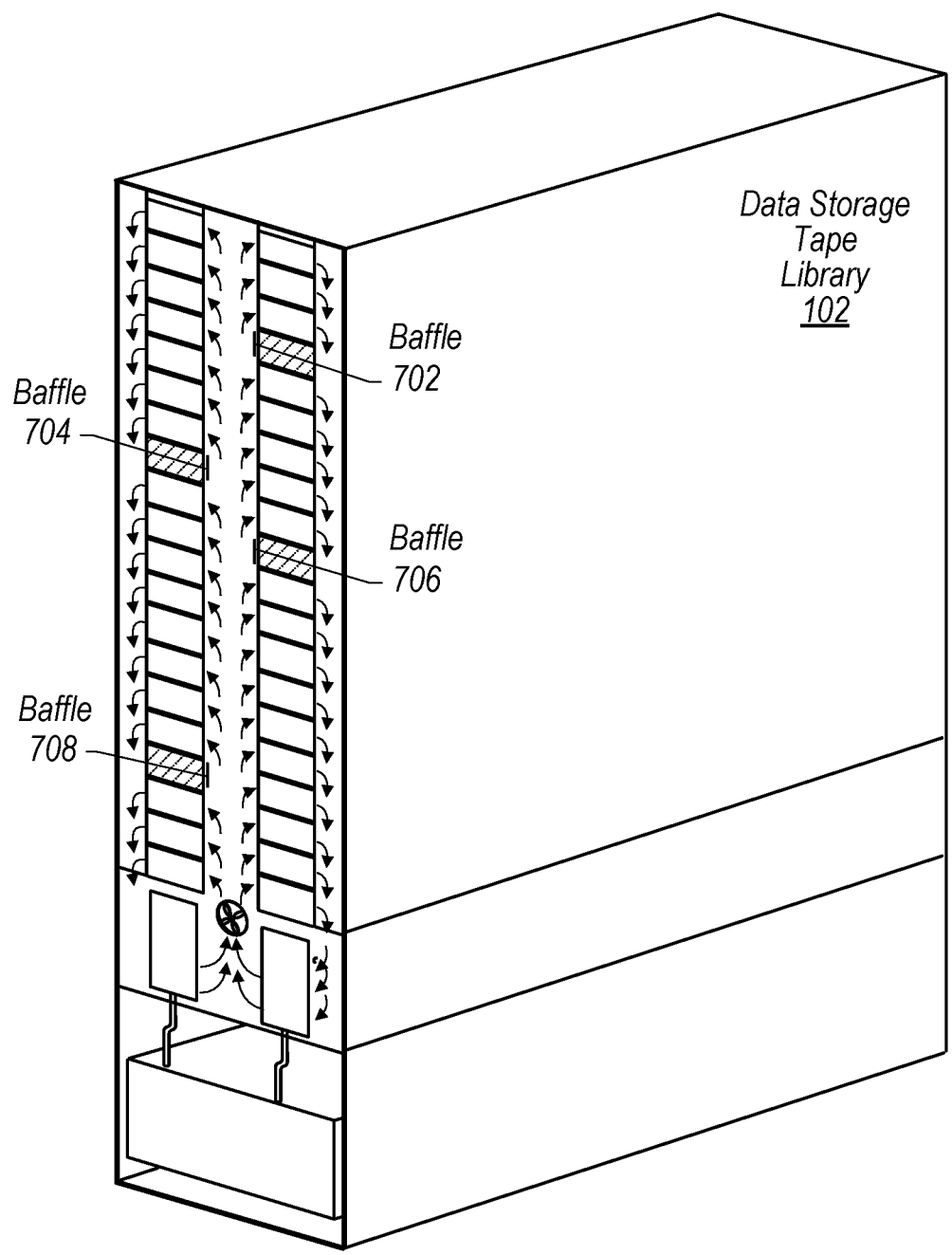
FIG. 7 illustrates a perspective view of an interior of a data storage tape library comprising a hermetically sealed enclosure and a cooling portion outside of the hermetically sealed enclosure, wherein the data storage tape library has a modular construction configured to be inserted in an open rack space as a unit.

FIG. 7 illustrates a perspective view of an interior of a data storage tape library comprising a hermetically sealed enclosure and a cooling portion outside of the hermetically sealed enclosure, wherein the data storage tape library has a modular construction configured to be inserted in an open rack space as a unit. FIG. 7 also illustrates baffles that may be used to block air flow through open slots of a tape magazine of the data storage tape library, according to some embodiments.

In some embodiments, a data storage tape library 102 may include spring loaded hinged baffles that automatically close when a data storage tape cartridge is removed from a slot in a tape magazine. Such baffles may prevent air from free-flowing through an open slot and frustrating air balance through the different levels and slots of the data storage magazine. For example, FIG. 7 shows empty slots that have been blocked from free-flowing air via baffles 702, 704, 706, and 708.

Figure 8:
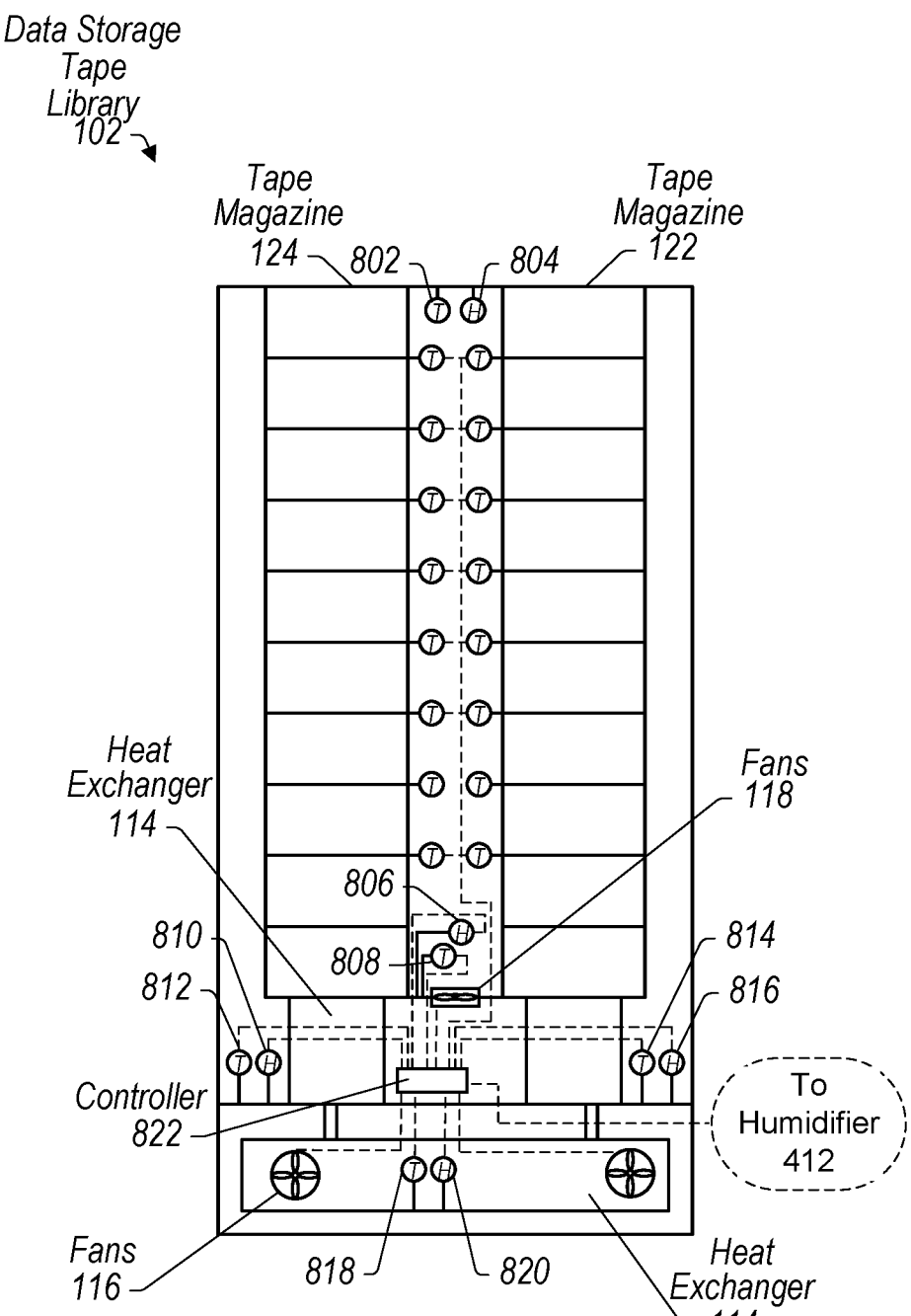
FIG. 8 illustrates a front view of an interior of an example configuration of a data storage tape library comprising a hermetically sealed enclosure and a cooling portion outside of the hermetically sealed enclosure, wherein the data storage tape library has a modular construction configured to be inserted in an open rack space as a unit.

FIG. 8 illustrates a front view of an interior of an example configuration of a data storage tape library comprising a hermetically sealed enclosure and a cooling portion outside of the hermetically sealed enclosure, wherein the data storage tape library has a modular construction configured to be inserted in an open rack space as a unit. FIG. 8 also illustrates a climate controller and associated sensors that may be included in the data tape storage library, according to some embodiments.

In some embodiments, a data storage tape library, such as data storage tape library 102, may include a climate controller, such as controller 822. Also, the data storage tape library may include temperature, humidity, and/or particulate matter sensors distributed throughout an interior of the sealed enclosure 106 and/or in open cooling portion 110.

For example, data storage tape library 102 illustrated in FIG. 8 includes temperature sensors 802 and humidity sensor 804 located adjacent to tapes at different levels of tape magazines 122 and 124. Also, data storage tape library 102 includes temperature sensor 808 and humidity sensor 806 adjacent to an exhaust side of fans 118. Additionally, a data storage tape library may include temperature and humidity sensors upstream of heat exchanger 114 in the sealed enclosure 106, such as temperature sensor 812 and 814 and humidity sensors 810 and 816. In some embodiments, a data storage tape library may also include temperature and/or humidity sensors to measure cooling air provided to the open cooling portion 110, such as temperature sensor 818 and humidity sensor 820.

Figure 12:
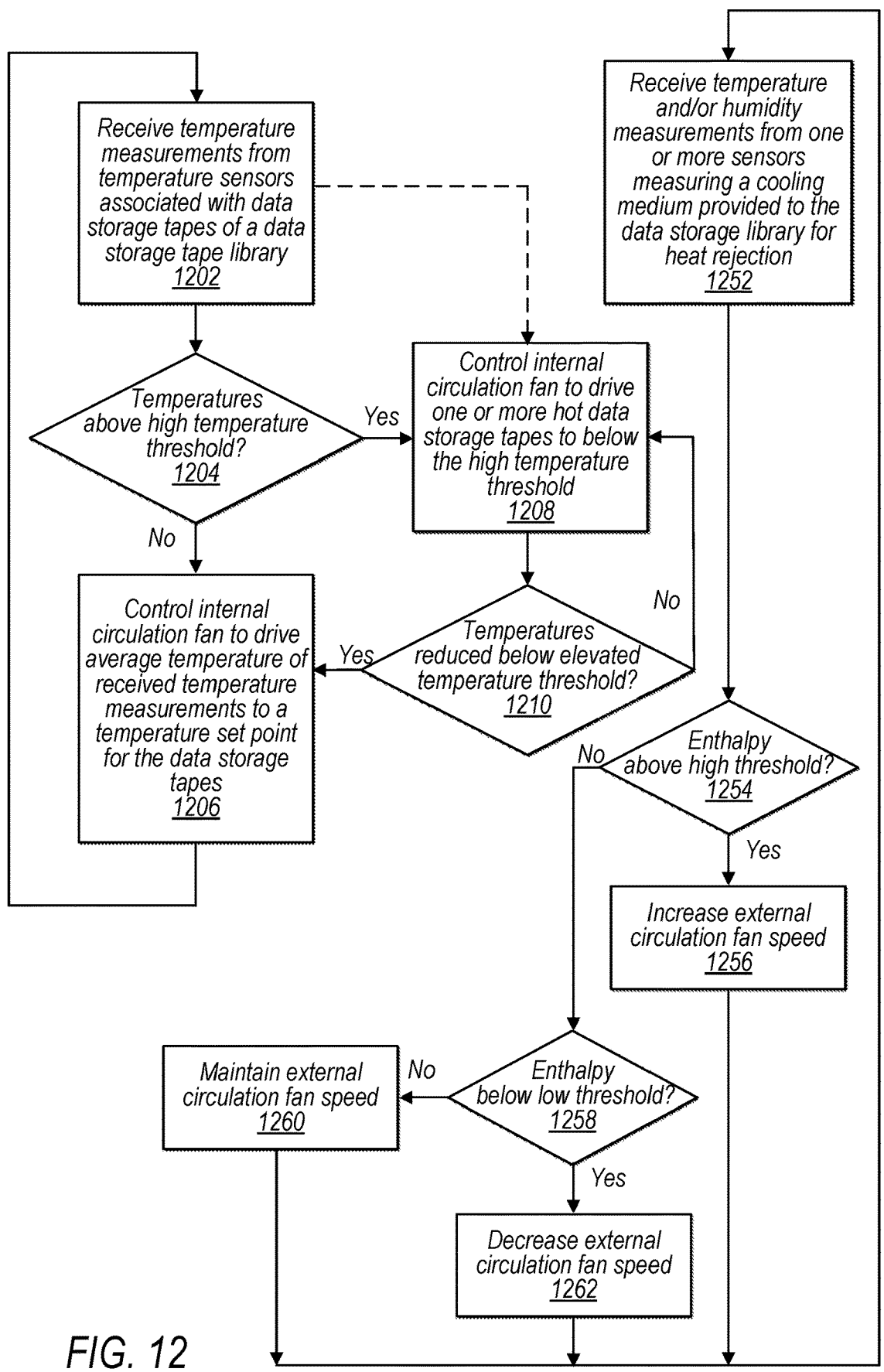
FIG. 12 is a flowchart illustrating example logic that a controller of a data storage tape library comprising a hermetically sealed enclosure and a cooling portion outside of the hermetically sealed enclosure may use to cool the data storage tape library, according to some embodiments.
Figure 13:
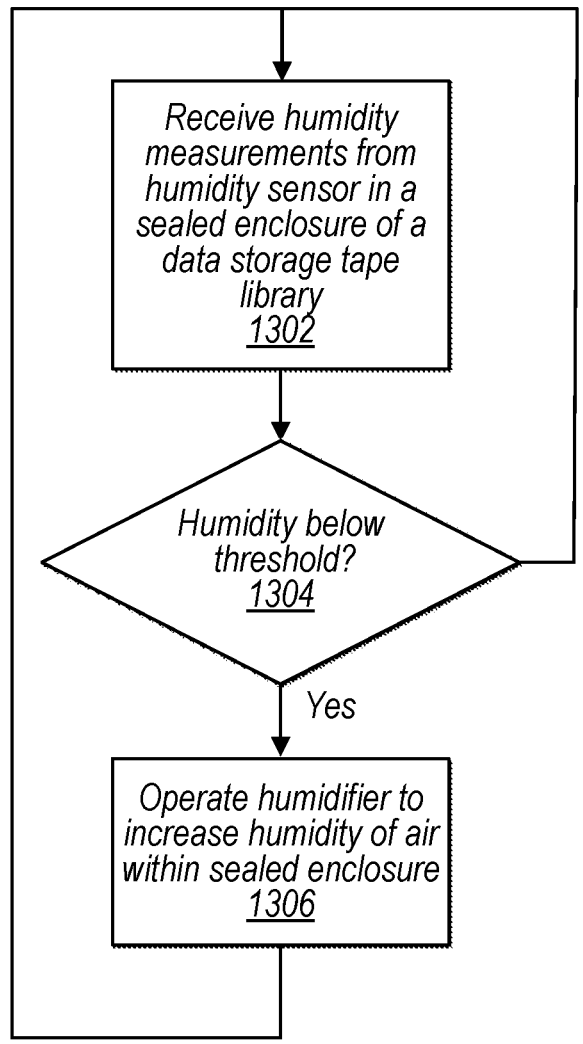
FIG. 13 is a flowchart illustrating example logic that a controller of a data storage tape library comprising a hermetically sealed enclosure and a cooling portion outside of the hermetically sealed enclosure may use to control humidity within the hermetically sealed enclosure of the data storage tape library, according to some embodiments.

In some embodiments, controller 822 may receive temperature and/or humidity signals from the various sensors and determine control speeds for fans 118 and fans 116, along with determining a control output to humidifier 412. For example, FIG. 12 illustrates an example control logic controller 822 may utilize to control fans 116 and 118. Also, FIG. 13 illustrates an example control logic that controller 822 may utilize to control humidifier 412.

Figure 9A:
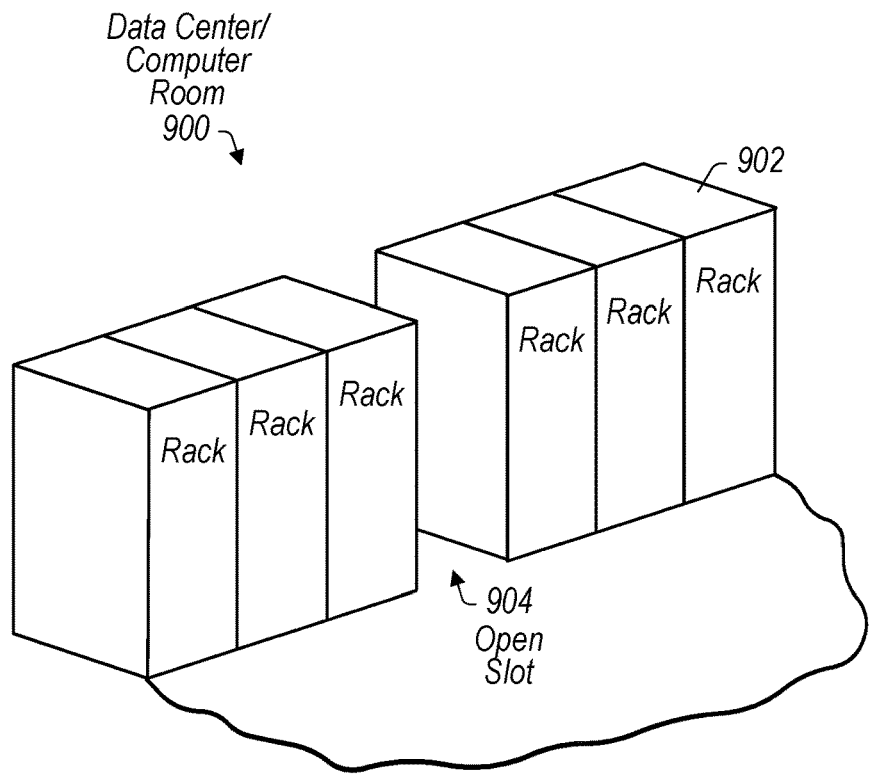
FIG. 9A illustrates a portion of a computer room comprising a row of rack-mounted computing systems, wherein there is an open rack slot in the row, according to some embodiments.
Figure 9B:
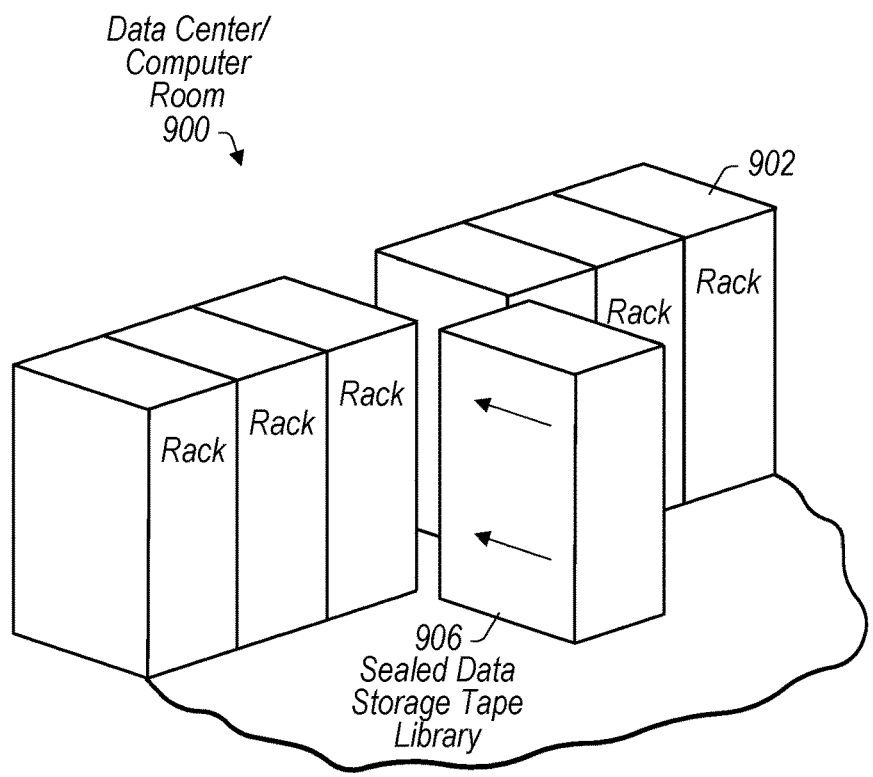
FIG. 9B illustrates a data storage tape library with a modular frame construction being inserted in the open rack slot in the row as a single unit, wherein the data storage tape library comprises a hermetically sealed enclosure within the modular frame and a cooling portion within the modular frame but outside of the hermetically sealed enclosure, according to some embodiments.

FIG. 9A illustrates a portion of a computer room comprising a row of rack-mounted computing systems, wherein there is an open rack slot in the row, according to some embodiments. FIG. 9B illustrates a data storage tape library with a modular frame construction being inserted in the open rack slot in the row as a single unit, wherein the data storage tape library comprises a hermetically sealed enclosure within the modular frame and a cooling portion within the modular frame but outside of the hermetically sealed enclosure, according to some embodiments.

Data center/computer room 900 includes a row of racks 902 and an open slot 904 in the row. As can be seen in FIG. 9B, a sealed modular data storage tape library 906 may be installed in the open slot 904 as a single modular unit contained within a frame structure of the single modular unit that has a similar size and shape as the other racks 902 in the row. Also, the hermetically sealed enclosure may be pre-sealed and delivered to the data center/computer room 900 already sealed and purged and ready to be installed as a modular unit.

Figure 10:
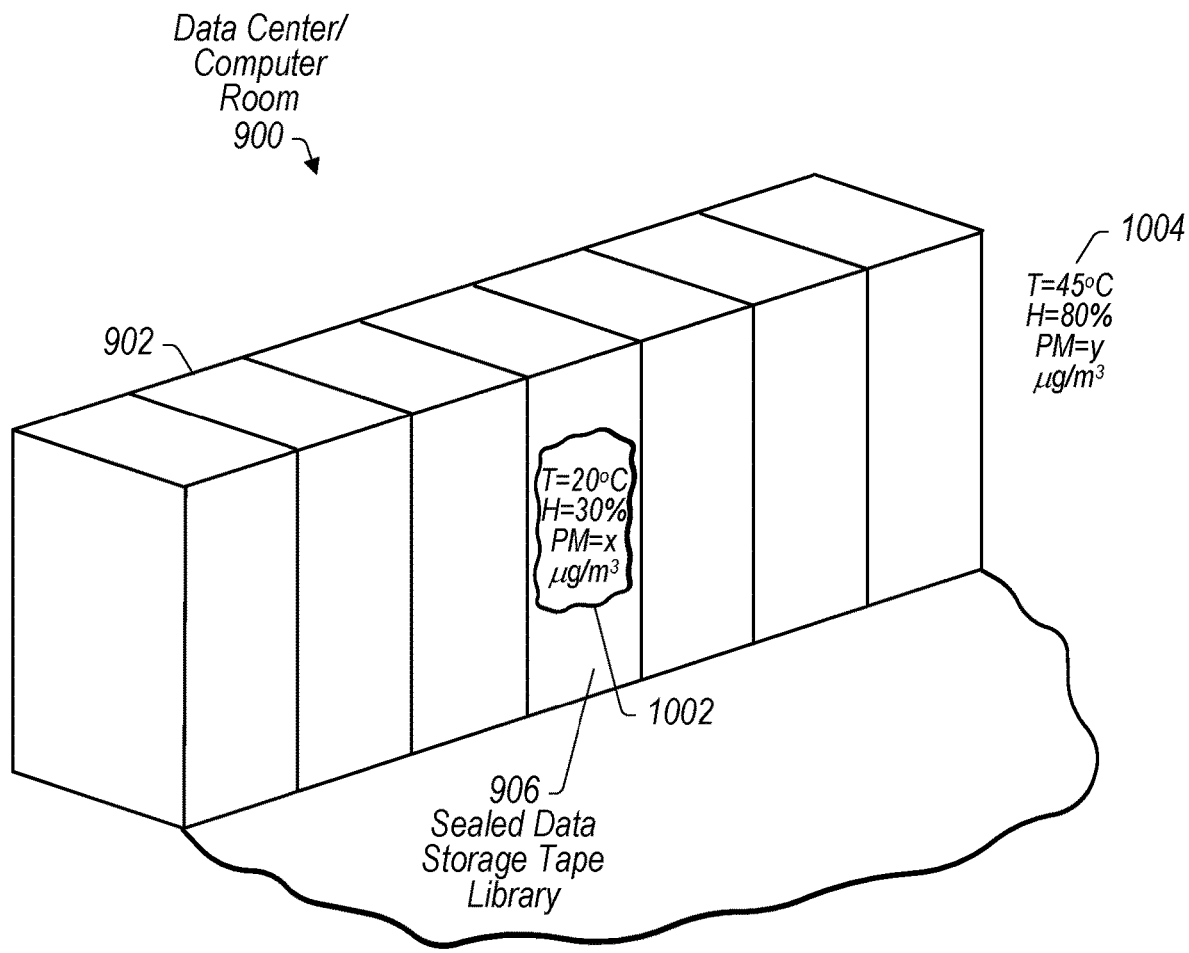
FIG. 10 illustrates environmental conditions within the data storage tape library being controlled independently from environmental conditions within the computer room, according to some embodiments.

FIG. 10 illustrates environmental conditions within the data storage tape library being controlled independently from environmental conditions within the computer room, according to some embodiments.

As can be seen in FIG. 10, environmental conditions 1002 within the sealed enclosure 106 of sealed data storage tape library 906 may be maintained independent of overall environmental conditions 1004 if data center/computer room 900.

Figure 11:
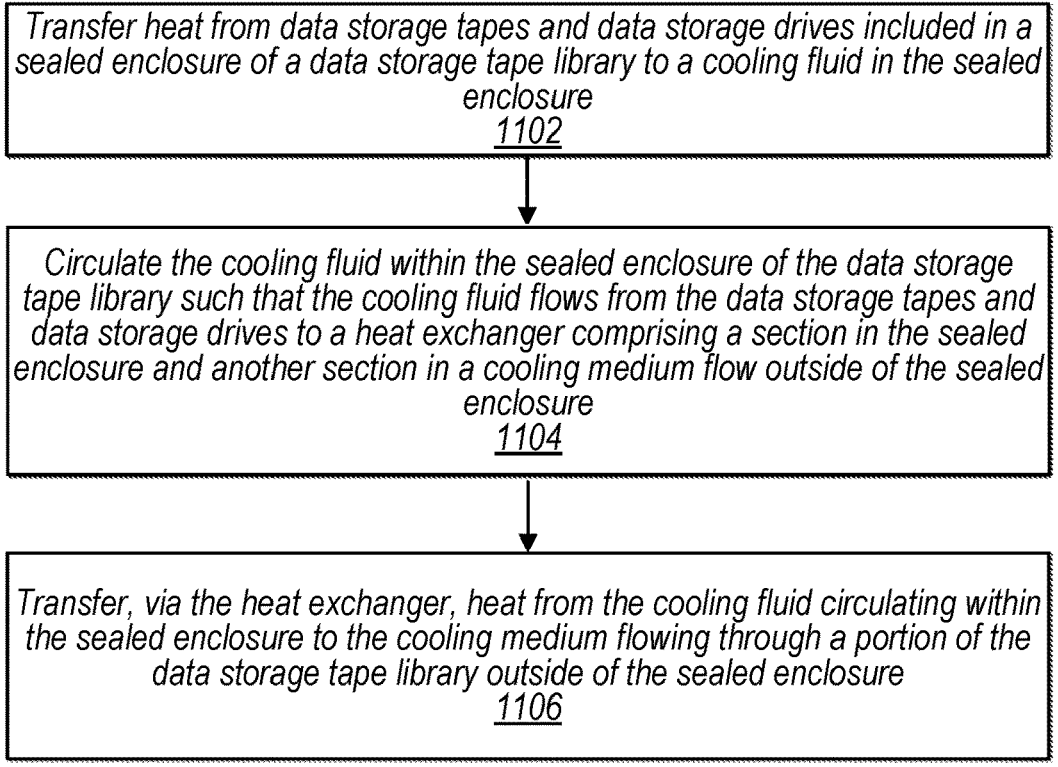
FIG. 11 is a flowchart of an example method of cooling a data storage tape library comprising a hermetically sealed enclosure and a cooling portion outside of the hermetically sealed enclosure, wherein the data storage tape library has a modular construction configured to be inserted in an open rack space as a unit, according to some embodiments.

FIG. 11 is a flowchart of an example method of cooling a data storage tape library comprising a hermetically sealed enclosure and a cooling portion outside of the hermetically sealed enclosure, wherein the data storage tape library has a modular construction configured to be inserted in an open rack space as a unit, according to some embodiments.

At 1102, heat is transferred from data storage tapes and data storage drives included in a sealed enclosure of a data storage tape library to a cooling fluid in the sealed enclosure.

At 1104, the cooing fluid is circulated within the sealed enclosure of the data storage tape library such that the cooling fluid flows from the data storage tapes and data storage drives to a heat exchanger comprising a section in the sealed enclosure and another section in a cooling medium flow outside of the sealed enclosure.

At 1106, heat is transferred via the heat exchanger from the cooling fluid circulating within the sealed enclosure to the cooling medium flowing through a portion of the data storage tape library outside of the sealed enclosure.

FIG. 12 is a flowchart illustrating example logic that a controller of a data storage tape library comprising a hermetically sealed enclosure and a cooling portion outside of the hermetically sealed enclosure may use to cool the data storage tape library, according to some embodiments.

At 1202, a controller for a data storage tape library receives temperature sensors associated with data storage tapes in a sealed enclosure of the data storage tape library.

At 1204, the controller determines whether or not any of the temperatures are above a high-temperature threshold, if not, at 1206 the controller controls the internal circulation cooling fans (e.g. fans 118) based on an average of the received temperature measurements. If the controller determines at 1204 that at least one of the temperatures is above the high temperature threshold (and the sensor is not failed). The controller, at 1208 controls the internal circulation fan (e.g. fans 118) based on the hottest measured temperature. At 1210, the controller determines whether or not the hottest temperature(s) have been brought down to below another elevated temperature threshold, which serves as a latch for the high temperature threshold. If so, the controller reverts to average temperature control at 1206.

Also, at 1252, the controller receives temperature and/or humidity measurements from one or more sensors measuring a cooling medium provided to the data storage library for heat rejection. If receiving both temperature and humidity, the controller may determine an enthalpy value for the cooling air, or other suitable metric that represents the capacity of the cooling air to remove heat. If only temperature measurements are performed, temperature may be used as a proxy for enthalpy. At 1254, the controller determines if the enthalpy is above a high threshold, if so, at 1256, it increases a speed of the external circulation fans (e.g. fans 116), if not at 1258 the controller determines if the enthalpy is below a low threshold, if so at 1262 the controller reduces the fan speed of the external circulation fans (e.g. fans 116). If the enthalpy is between the high and low threshold, at 1260 the controller maintains the current fan speed of the external circulation fans (e.g. fans 116).

FIG. 13 is a flowchart illustrating example logic that a controller of a data storage tape library comprising a hermetically sealed enclosure and a cooling portion outside of the hermetically sealed enclosure may use to control humidity within the hermetically sealed enclosure of the data storage tape library, according to some embodiments.

At 1302, the controller receives humidity measurements from humidity sensor in a sealed enclosure of a data storage tape library.

At 1304, the controller determines whether or not the measured humidity in the hermetically sealed enclosure is below a low humidity threshold, and if so at 1306 causes the humidifier to increase the humidity within the hermetically sealed enclosure. Otherwise the controller continues to monitor humidity levels within the hermetically sealed enclosure.

Figure 14:
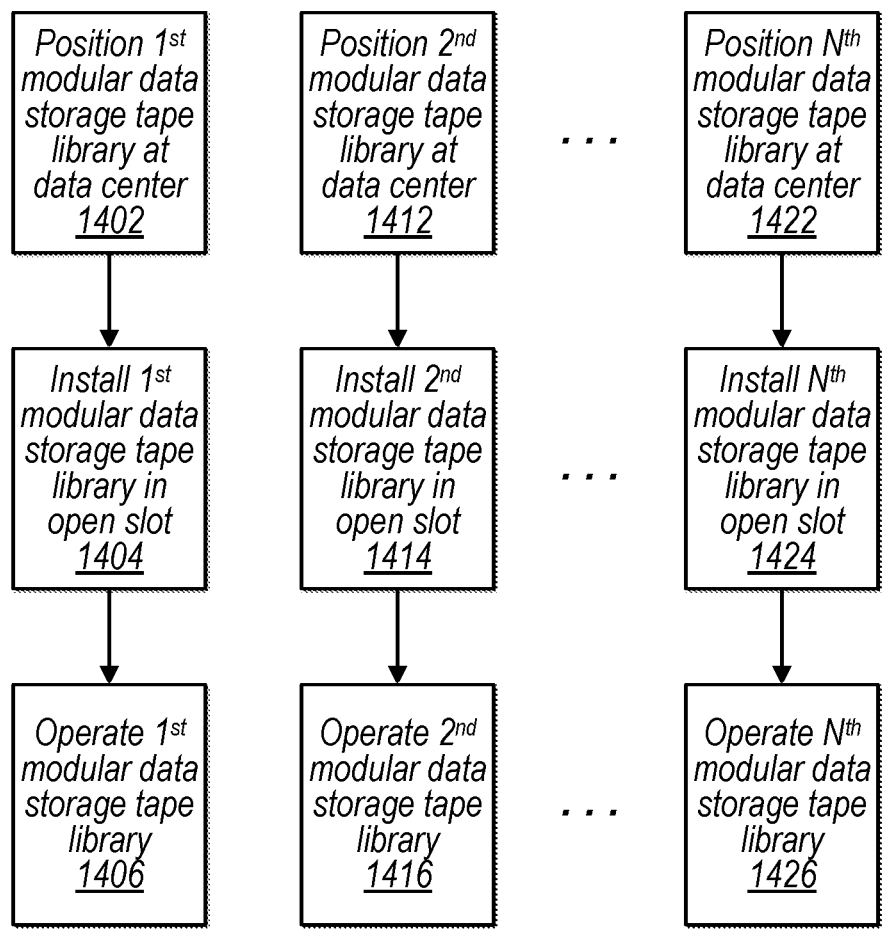
FIG. 14 is a flowchart illustrating a method of installing a set of data storage tape libraries each having a common size and design using a modular frame construction that includes a hermetically sealed enclosure within the modular frame and a cooling portion within the modular frame but outside of the hermetically sealed enclosure, according to some embodiments.

FIG. 14 is a flowchart illustrating a method of installing a set of data storage tape libraries each having a common size and design using a modular frame construction that includes a hermetically sealed enclosure within the modular frame and a cooling portion within the modular frame but outside of the hermetically sealed enclosure, according to some embodiments.

At 1402, a $1^{st}$ modular data storage tape library is positioned for installation at a data center (such as shown in FIGS. 9A and 9B). At 1404, the $1^{st}$ modular data storage tape library is installed in the open slot and at 1406 the $1^{st}$ modular data storage tape library is operated.

Because a modular data storage tape library may have a standard design and standard form factor as a standard computing rack, any number of interchangeable modular data storage tape libraries may be pre-build/pre-assembled and installed at the same or different data centers without needing to design a special purpose room, change a cooling system at the data center or otherwise modify the data center. Thus at 1412, 1414, and 1414 the process is repeated for a $2^{nd}$ modular data storage tape library. Also, this may be repeated for any number of modular data storage tape libraries without additional engineering required to custom configured cooling for the modular data storage tape libraries. For example, at 1422, 1424, and 1426 the process is repeated for an $N^{th}$ modular data storage tape library.

Figure 15:
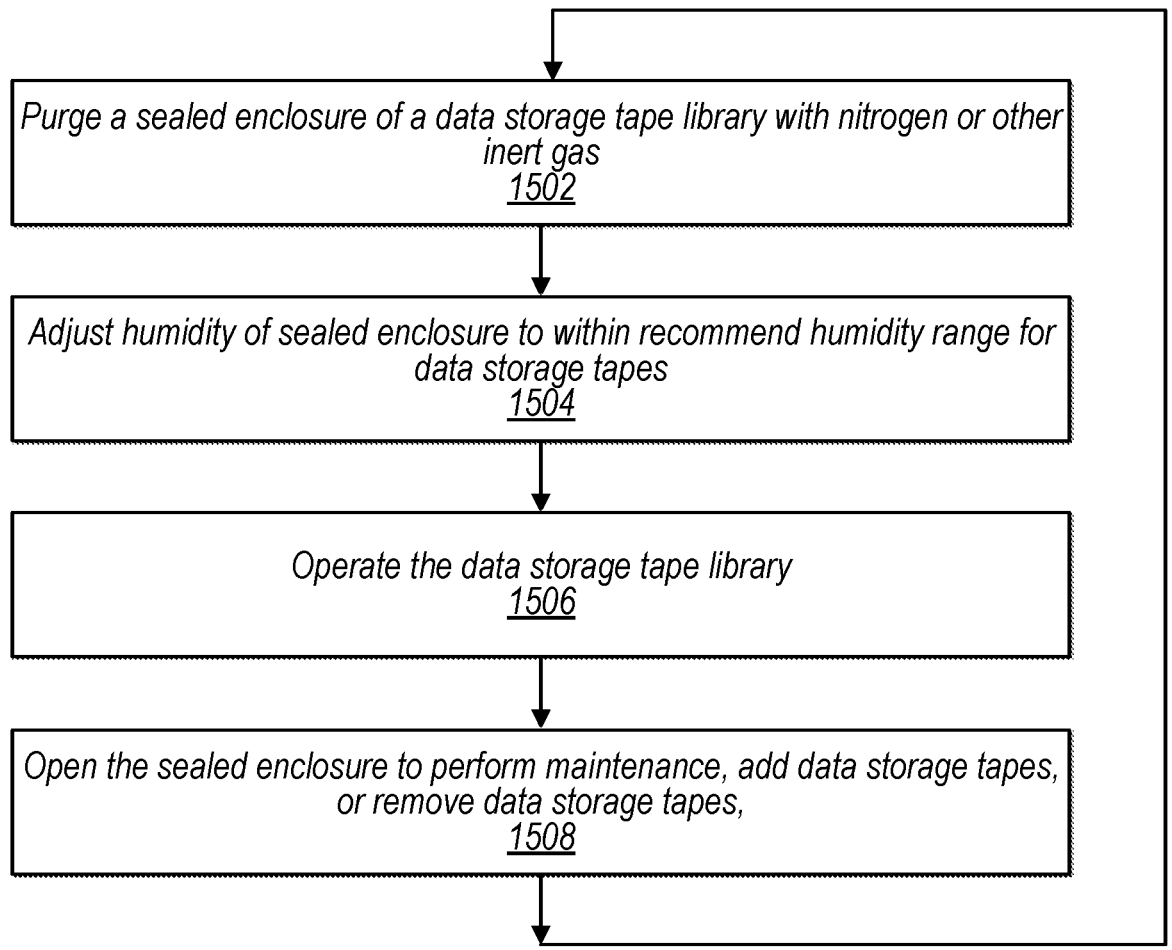
FIG. 15 illustrates an example method for purging the hermetically sealed enclosure of the data storage tape library before operating the data storage tape library and/or after opening the data storage tape library, according to some embodiments.

FIG. 15 illustrates an example method for purging the hermetically sealed enclosure of the data storage tape library before operating the data storage tape library and/or after opening the data storage tape library, according to some embodiments.

At 1502, the sealed enclosure of the modular data storage library is purged with an inert gas, such as nitrogen.

At 1504, a humidity level within hermetically sealed enclosure is adjusted to a range suitable for the tape of data storage tapes installed in the tape magazines of the sealed enclosure.

At 1506, the modular data storage library is operated. Because no air enters or leaves the hermetically sealed enclosure, the relative humidity in the hermetically sealed enclosure will remain constant (e.g. no water vapor is introduced or escapes from the hermetically sealed enclosure).

At 1508, the hermetically sealed enclosure is opened, for example to perform maintenance, access the data storage tapes, add or remove data storage tapes, etc. In response to opening the sealed enclosure, the process is repeated starting with the purge at 1502.

Although the embodiments above have been described in considerable detail, numerous variations and modifications will become apparent to those skilled in the art once the above disclosure is fully appreciated. It is intended that the following claims be interpreted to embrace all such variations and modifications unless indicated otherwise.

What is claimed is:

1. A data storage tape library, comprising:
   a modular frame structure;
   a sealed enclosure positioned within a first portion of the modular frame structure, the sealed enclosure comprising:
      data storage tapes included in the sealed enclosure;
      a data storage drive included in the sealed enclosure; and
      a robot mechanism included in the sealed enclosure configured to move the data storage tapes between storage locations in the sealed enclosure and the data storage drive included in the sealed enclosure;
   a second portion within the modular frame structure that is outside of the sealed enclosure, the second portion comprising:
      an inlet configured to receive a cooling medium; and
      an outlet configured to exhaust the cooling medium; and
   a heat exchanger positioned at least partially in the first portion and at least partially in the second portion, the heat exchanger configured to:
      transfer heat between the first portion and the second portion through a seal of the sealed enclosure such that heat from the sealed enclosure is rejected into the cooling medium without introducing the cooling medium into the sealed enclosure.

2. The data storage tape library of claim 1, wherein the data storage tape library is a pre-assembled module configured to be installed in a facility as a single unit.

3. The data storage tape library of claim 1, wherein the sealed enclosure is filled with an inert gas and at least some water vapor such that a relative humidity within the sealed enclosure is less than a threshold level of relative humidity.

4. The data storage tape library of claim 1, wherein:
   the second portion is positioned in the modular frame structure above the first portion; and
   the heat exchanger positioned at least partially in the first portion and at least partially in the second portion comprises a thermal siphon configured to:
      receive heat transferred to the thermal siphon from the first portion, wherein the heat causes a working fluid of the thermal siphon to change from a liquid phase to a vapor phase;
      reject heat from the vapor phase of the working fluid into the cooling medium of the second portion such that the working fluid of the thermal siphon condenses into the liquid phase; and
      utilize gravity to return the condensed working fluid to a portion of the heat exchanger in thermal communication with the first portion.

5. The data storage tape library of claim 1, wherein:
   the second portion is positioned in the modular frame structure below the first portion; and
   the heat exchanger positioned at least partially in the first portion and at least partially in the second portion comprises a heat pump configured to:
      receive heat transferred from the first portion, wherein the heat causes a working fluid of the heat pump to expand; and
      reject heat from the working fluid of the heat pump into the cooling medium of the second portion such that the working fluid is condensed.

6. The data storage tape library of claim 1, further comprising:
   a fan configured to circulate air sealed within the sealed enclosure through the heat exchanger and over the data storage tapes; and
   a tape magazine comprising:
      a structure that provides the storage locations for the data storage tapes; and
      air flow slots in the structure, wherein the air flow slots increase in size such that air flow slots further away from the fan have a larger size than air flow slots closer to the fan.

7. The data storage tape library of claim 6, wherein the tape magazine further comprises baffles configured to at least partially cover respective ones of the air flow slots if a data storage tape is not installed in a storage location associated with the respective air flow slot.

8. The data storage tape library of claim 7, further comprising:
   a center plenum within the sealed enclosure configured to direct cooling air from the heat exchanger toward the air flow slots in the structure of the tape magazine that provides the storage locations for the data storage tapes; and
   a peripheral plenum within the sealed enclosure positioned between the tape magazine and an outer wall of the sealed enclosure, wherein the peripheral plenum is configured to direct cooling air exhausted from the tape magazine toward the heat exchanger.

9. The data storage tape library of claim 8, further comprising:
   another fan configured to direct air through the second portion and across the portion of the heat exchanger positioned in the second portion;
   temperature sensors positioned adjacent to respective ones of the data storage tapes; and
   a controller configured to adjust a speed of the fan or the other fan such that respective temperatures measured by the temperature sensors adjacent to the data storage tapes are within a threshold temperature range.

10. The data storage tape library of claim 9, wherein the controller is configured to:
   control the fan and the other fan such that an average temperature of the temperature measurements from the temperature sensors is controlled to a temperature set point; and
   transition the control of the fan or the other fan to a second control scheme if any one of the temperature measurements from the temperature sensors is above a high temperature threshold, wherein in the second control scheme the fan and the other fan are controlled to reduce the temperature of the temperature sensor registering a high temperature to less than an elevated temperature threshold, wherein the elevated temperature threshold is less than the high temperature threshold.

11. The data storage tape library of claim 9, further comprising:
a humidity sensor positioned within the sealed enclosure;
a water storage canister; and
a humidifier configured to introduce water vapor into the sealed enclosure using water from the water storage canister,
wherein the controller is further configured to:
control, via the humidifier, a level of humidity within the sealed enclosure such that the humidity is above a lower threshold level of humidity.

12. A data center comprising:
a row of racks comprising rack-mounted computer systems,
at least one data storage tape library positioned in the row of racks, wherein the at least one data storage tape library, comprises:
a modular frame structure;
a hermetically sealed enclosure within a first portion of the modular frame structure, comprising:
data storage tapes;
data storage drives; and
a robot mechanism configured to move the data storage tapes between storage locations in the hermetically sealed enclosure and the data storage drives included in the hermetically sealed enclosure; and
a second portion within the modular frame structure that is outside of the hermetically sealed enclosure, the second portion comprising:
an inlet configured to receive a cooling fluid or cooling air from a cooling system of the data center; and
an outlet configured to exhaust the cooling fluid or the cooling air to a return portion of the cooling system of the data center; and
a heat exchanger positioned at least partially in the hermetically sealed enclosure and at least partially in the second portion outside of the hermetically sealed enclosure, wherein the heat exchanger is configured to:
transfer heat from the hermetically sealed enclosure to the second portion outside of the sealed enclosure through a boundary of the hermetically sealed enclosure without introducing air from the data center into the hermetically sealed enclosure.

13. The data center of claim 12, wherein the hermetically sealed enclosure and the heat exchanger of the at least one data storage tape library are configured to prevent particulate matter in the data center, the cooling fluid, or the cooling air from entering the hermetically sealed enclosure.

14. The data center of claim 12, wherein the at least one data storage tape library further comprises:
a controller; and
a humidifier,
wherein the controller is configured to control, via the humidifier, a level of humidity within the hermetically sealed enclosure independent of humidity conditions in the data center.

15. The data center of claim 12, wherein the at least one data storage tape library further comprises:
a fan configured to circulate air sealed within the hermetically sealed enclosure through a portion of the heat exchanger and over the data storage tapes; and
a tape magazine comprising:
a structure that provides the storage locations for the data storage tapes; and
air flow slots in the structure, wherein the air flow slots increase in size such that air flow slots for data storage tapes further away from the fan have a larger size than air flow slots for data storage tapes closer to the fan.

16. The data center of claim 12, wherein the at least one data storage tape library further comprises:
a center plenum within the hermetically sealed enclosure configured to direct supply cooling air from the heat exchanger towards air flow slots in a structure of a tape magazine that provides the storage locations for the data storage tapes; and
a peripheral plenum within the hermetically sealed enclosure positioned between the tape magazine and an outer wall of the hermetically sealed enclosure, wherein the peripheral plenum is configured to direct cooling air exhausted from the tape magazine towards the heat exchanger.

17. A method of cooling a data storage tape library, comprising:
transferring heat from data storage tapes and a data storage drive included in a sealed enclosure included in a first portion of a modular frame structure for the data storage tape library to a cooling fluid within the sealed enclosure, wherein the sealed enclosure comprises a robot mechanism configured to move the data storage tapes between storage locations in the sealed enclosure and the data storage drive included in the sealed enclosure;
circulating the cooling fluid within the sealed enclosure such that the cooling fluid flows from the data storage tapes and the data storage drive to a heat exchanger comprising a portion at least partially in the sealed enclosure and another portion at least partially external to the sealed enclosure; and
transferring, via the heat exchanger, heat from the cooling fluid within the sealed enclosure to a cooling medium flowing through a second portion of the modular frame structure of the data storage tape library that is outside of the sealed enclosure,
wherein the heat is transferred via the heat exchanger such that heat from the sealed enclosure is rejected into the cooling medium without introducing the cooling medium into the sealed enclosure.

18. The method of claim 17, further comprising:
prior to putting the data storage tape library in use or subsequent to opening the sealed enclosure of the data storage tape library:
purging the sealed enclosure using an inert gas such that ambient air is removed from the sealed enclosure.

19. The method of claim 17, further comprising:
installing the data storage tape library in a facility as a single modular pre-assembled unit.

20. The method of claim 19, further comprising:
installing a plurality of other data-tape storage libraries in the facility or other facilities as single modular pre-assembled units, wherein the data storage tape library and the plurality of other data-tape storage libraries have a same size and a same design.

\* \* \* \* \*